(12) United States Patent
Tanaka et al.

(10) Patent No.: US 7,086,378 B2
(45) Date of Patent: Aug. 8, 2006

(54) DIRECT FUEL INJECTION INTERNAL COMBUSTION ENGINE

(75) Inventors: Daisuke Tanaka, Yokosuka (JP); Koji Hiraya, Yokohama (JP); Isamu Hotta, Yokohama (JP); Hirofumi Tsuchida, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/990,957

(22) Filed: Nov. 18, 2004

(65) Prior Publication Data

US 2005/0139191 A1    Jun. 30, 2005

(30) Foreign Application Priority Data

Dec. 24, 2003   (JP)   ............................. 2003-427304

(51) Int. Cl.
*F02B 3/02* (2006.01)

(52) U.S. Cl. ........................ 123/305; 123/298; 123/301

(58) Field of Classification Search ................ 123/298, 123/301, 305
See application file for complete search history.

(56) References Cited

U.S. PATENT DOCUMENTS

| | | | |
|---|---|---|---|
| 5,335,635 A | 8/1994 | Kadoi et al. | |
| 5,816,215 A * | 10/1998 | Yoshikawa et al. | 123/301 |
| 5,927,244 A * | 7/1999 | Yamauchi et al. | 123/305 |
| 6,691,673 B1 * | 2/2004 | Katayama | 123/305 |
| 6,928,978 B1 * | 8/2005 | Iwahashi et al. | 123/298 |
| 2002/0073958 A1 * | 6/2002 | Wright | 123/305 |

FOREIGN PATENT DOCUMENTS

| | | |
|---|---|---|
| JP | 06-042352 | 2/1994 |
| JP | 11-82028 | 3/1999 |

* cited by examiner

*Primary Examiner*—Erick R Solis
(74) *Attorney, Agent, or Firm*—Global IP Counselors, LLP (57) ABSTRACT

A direct fuel injection internal combustion engine includes a fuel injector arranged above a center portion of the piston and positioned higher than a combustion chamber upper surface of a cylinder head. The cylinder head includes a recess portion in which a tip of the fuel injector is disposed in a cross sectional view of the cylinder head in a plane perpendicular to a fuel injection center axis. The recess portion is provided with a channel extending longitudinally away from the tip of the fuel injector configured and arranged to reduce negative pressure within the recess portion. The channel is oriented in such a direction as to avoid the interference between the channel and other parts of the cylinder head. When the fuel injector is a multi-hole fuel injector, the channel can be oriented toward a direction along a centerline between two adjacent injection vents of the fuel injector.

16 Claims, 9 Drawing Sheets

DIRECT FUEL INJECTION INTERNAL COMBUSTION ENGINE

BACKGROUND OF THE INVENTION

1. Field of the Invention

The present invention relates to a direct fuel injection internal combustion engine in which a fuel is directly injected into a combustion chamber. More particularly, the present invention relates to a direct fuel injection internal combustion engine in which a fuel injector is installed in a cylinder head above a center portion of a piston and positioned higher than a combustion chamber top surface formed by the cylinder head.

2. Background Information

In a conventional direct fuel injection internal combustion engine, a fuel injector is arranged so that a tip of the fuel injector faces in a combustion chamber. Such conventional direct fuel injection internal combustion engine is configured and arranged to perform stratified combustion by injecting fuel from the fuel injector during a compression stroke to form a stratified fuel-air mixture in a prescribed operating region. In such conventional direct fuel injection internal combustion engine, the fuel consumption of the engine in low load regions and medium load regions can be greatly reduced by stratifying the fuel-air mixture when the engine is operating in these regions.

Japanese Laid-Open Patent Publication No. 11-082028 (paragraphs 0010 to 0012) discloses such a conventional direct fuel injection internal combustion engine in which a fuel injector is arranged above a center portion of a piston and in which a spark plug is arranged closely adjacent to the fuel injector. The direct fuel injection internal combustion engine described in this publication has a layout interference problem between the fuel injector and the spark plug. More specifically, if the fuel injector is installed in a fuel injector opening formed in the cylinder head along the center axis of the cylinder, the spark plug has to be installed in the cylinder head either between an intake port and the fuel injector opening or between an exhaust port and the fuel injector opening. In either case, the space available for installing the spark plug is limited to avoid interference with the intake or exhaust port. Particularly, if the spark plug is installed between the exhaust port and the fuel injector opening, it is necessary to install the spark plug sufficiently far from the exhaust port in order to protect the spark plug from heat of the exhaust gas. Thus, in such case, the degree of design freedom with respect to the layout of the spark plug is further limited.

In order to solve such layout interference problem, Japanese Laid-Open Patent Publication No. 6-042352 (FIG. 1) discloses a direct fuel injection internal combustion engine in which a position of the fuel injector is shifted upward relative to a bottom surface of a cylinder head that forms an upper surface of a combustion chamber (hereinafter referred as "a combustion chamber upper surface of the cylinder head"). More specifically, in the direct fuel injection internal combustion engine disclosed in this publication, a recessed part is provided in the cylinder head that communicates with the fuel injector opening and the combustion chamber such that a tip end of a nozzle of the fuel injector is positioned within the recessed part. The recessed part has a peripheral side wall surface with a circular cross sectional outline along planes perpendicularly arranged relative to a fuel injection center axis of the fuel injector. Moreover, the recessed part is tapered along an entire depth of the recessed part such that an internal diameter of the recessed part increases as it approaches the combustion chamber.

In view of the above, it will be apparent to those skilled in the art from this disclosure that there exists a need for an improved direct fuel injection internal combustion engine. This invention addresses this need in the art as well as other needs, which will become apparent to those skilled in the art from this disclosure.

SUMMARY OF THE INVENTION

The direct fuel injection internal combustion engine with the recessed part described in the above mentioned publication alleviates the layout limitation of the fuel injector and the spark plug in the cylinder head. Moreover, the tapered shape of the recessed part prevents a problem of a fuel stream adhering to a wall surface of the recessed part. However, when the recessed part is merely tapered just wide enough to prevent the fuel stream from adhering to the wall surface, there are some problems still remained.

For example, when the fuel is injected into the combustion chamber via the recessed part, the air inside the recessed part is pulled by the flow of the fuel stream and flows out of the recessed part. Consequently, a negative pressure is created in a space between the fuel stream and the wall surface of the recessed part. This negative pressure acts to draw a path of the fuel stream toward the wall surface of the recessed part and distorts an overall shape of the fuel stream. In such case, a desired shape of the fuel stream cannot be achieved in the combustion chamber. This negative pressure problem could be resolved by increasing a taper angle of the recessed part such that air from the combustion chamber flows more readily into the recessed part. However, a problem of interference between the recessed part and intake ports and/or exhaust ports limits the degree to which the taper angle can be widened when the fuel injector is arranged along or near the center axis of the cylinder.

Accordingly, one object of the present invention is to provide a direct fuel injection internal combustion engine that can suppress a generation of negative pressure inside the recessed part so that the desired shape of fuel stream can be achieved when the fuel injector is arranged above a center portion of the piston and positioned higher than the combustion chamber upper surface of the cylinder head.

In order to achieve the above mentioned and other objects of the present invention, a direct fuel injection internal combustion engine is provided that comprises an engine block, cylinder head and a fuel injector. The engine block has at least one cylinder bore with a piston mounted to reciprocate therein along a reciprocation axis. The cylinder head is disposed on the engine block with a combustion chamber formed by an combustion chamber upper surface of the cylinder head, the cylinder bore and a top surface of the piston. The cylinder head includes a recess portion continuously formed within the combustion chamber upper surface. The fuel injector is disposed in the recess portion of the cylinder head above a center portion of the piston. The fuel injector is arranged such that a tip of the fuel injector is located above the combustion chamber upper surface within the recess portion to inject fuel such that a fuel injection center axis is substantially parallel to the reciprocation axis of the piston. The recess portion of the cylinder head has a peripheral side wall surface with a similar geometric cross sectional outline along planes perpendicularly arranged relative to the fuel injection center axis. The geometric cross sectional outline of the peripheral side wall surface has a first wall section being spaced by a first distance from the fuel injection center axis that is shorter than a second distance between a second wall section and the fuel injection center axis as measured perpendicularly to the fuel injection center axis. The second wall section defines a channel extending longitudinally away from the tip of the fuel injector that is configured and arranged to reduce negative pressure within the recess portion otherwise resulting from fuel being injected from the fuel injector.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
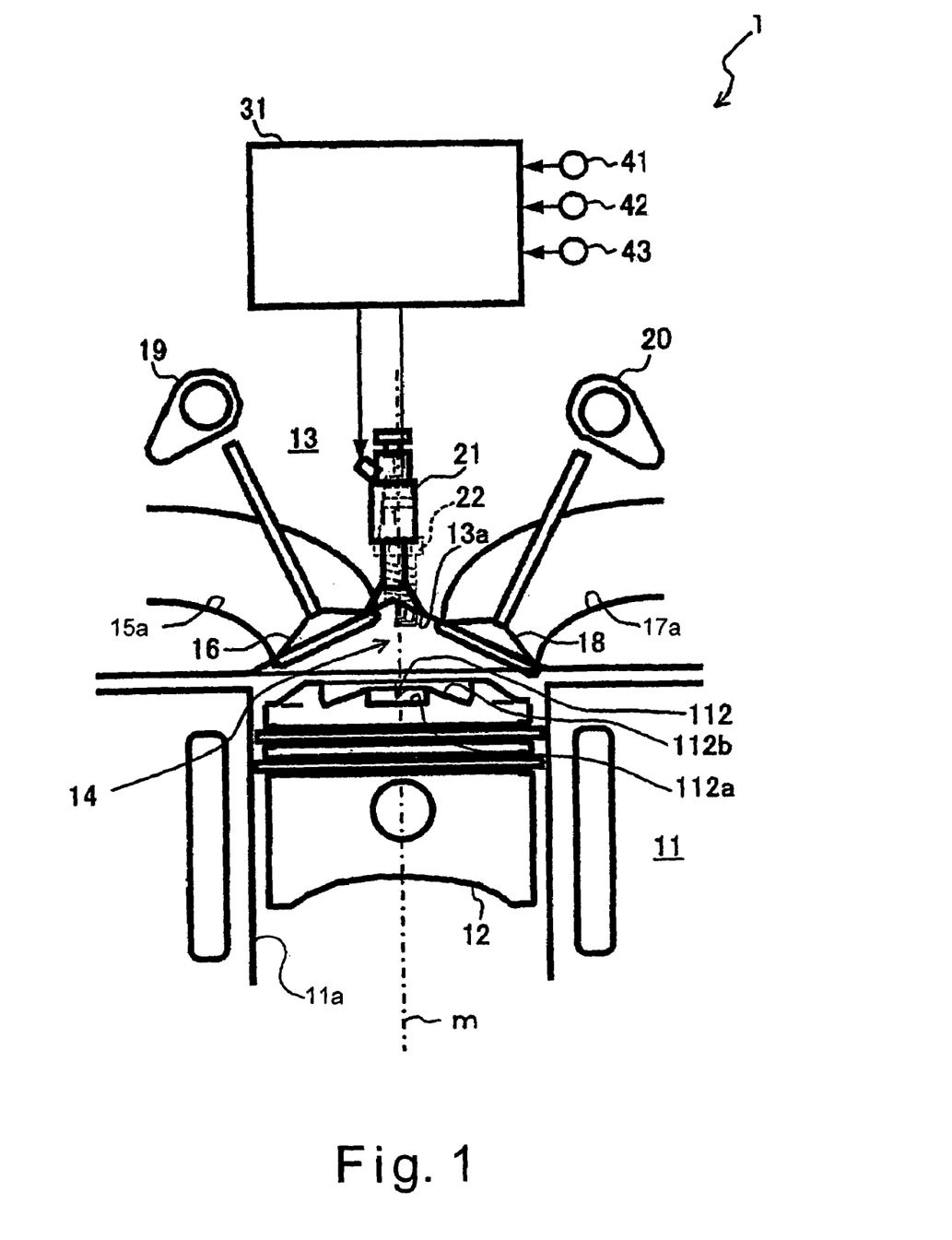
FIG. 1 is a diagrammatic partial cross sectional view of a combustion chamber of a direct fuel internal combustion engine in accordance with a first embodiment of the present invention.

Referring initially to FIG. 1, a direct fuel injection internal combustion engine 1 is illustrated in accordance with a first embodiment of the present invention. FIG. 1 is a partial cross sectional view of a combustion chamber of the engine 1 of the first embodiment. The engine 1 is provided with a plurality of cylinders having identical configurations corresponding to FIG. 1. The cross sectional view illustrated in FIG. 1 is taken along a plane that is perpendicular to a direction in which the cylinders are arranged. FIG. 1 is depicted as viewed from a front side of the engine 1.

As seen in FIG. 1, the engine 1 of the present invention preferably includes a cylinder block 11 including a plurality of cylinder bores 11a (only one shown). A piston 12 arranged within each of the cylinder bores 11a of the cylinder block 11 to reciprocate in a conventional manner. Moreover, the engine 1 includes a cylinder head 13 disposed over the cylinder block 11 so that a combustion chamber 14 is formed by the cylinder bore 11a, a top surface of the piston 12 and a combustion chamber upper surface 13a formed at the bottom of the cylinder head 13. As seen in FIG. 1, the combustion chamber 14 of the present invention preferably has a pentroof structure.

Figure 2:
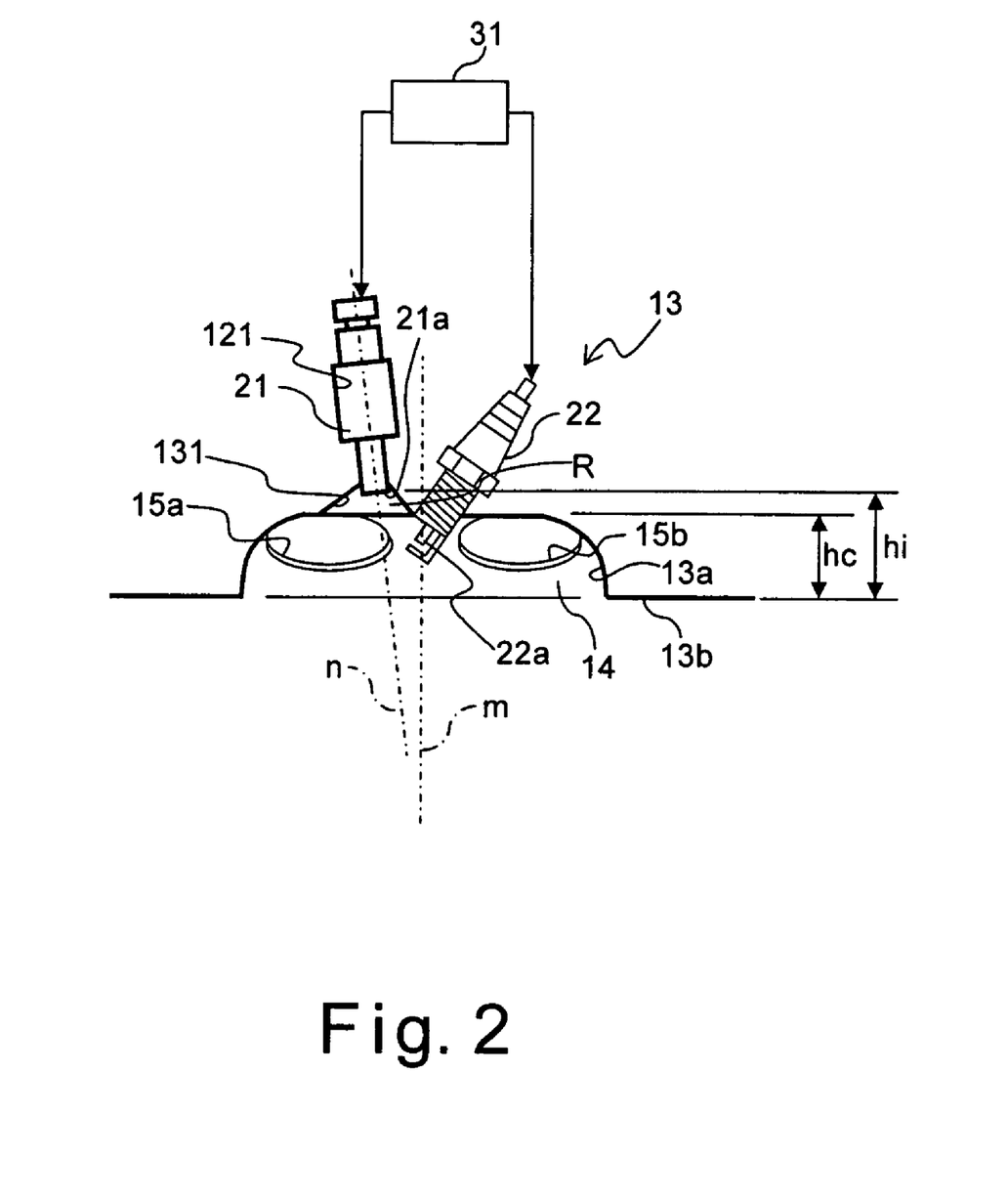
FIG. 2 is an enlarged diagrammatic partial cross sectional view illustrating a fuel injector and a spark plug disposed in a cylinder head of the direct fuel injection internal combustion engine in accordance with the first embodiment of the present invention.

The cylinder head 13 preferably includes first and second intake ports 15a and 15b (only the first intake port 15a is shown in FIG. 1) disposed in one side of the cylinder head 13 with respect to a cylinder center axis m (i.e., a reciprocation axis of the piston 12). As seen in FIG. 2, the ends of the first and second intake ports 15a and 15b form intake valve openings at the combustion chamber upper surface 13a that open into the combustion chamber 14. The first and second intake ports 15a and 15b are coupled to an intake manifold (not shown) to form air intake passages. An intake valve 16 is provided in each of the intake valve openings formed on the combustion chamber upper surface 13a to fluidly connect and disconnect the first and second intake ports 15*a* and 15*b* from the combustion chamber 14 by opening and closing the first and second intake ports 15*a* and 15*b*.

Figure 4:
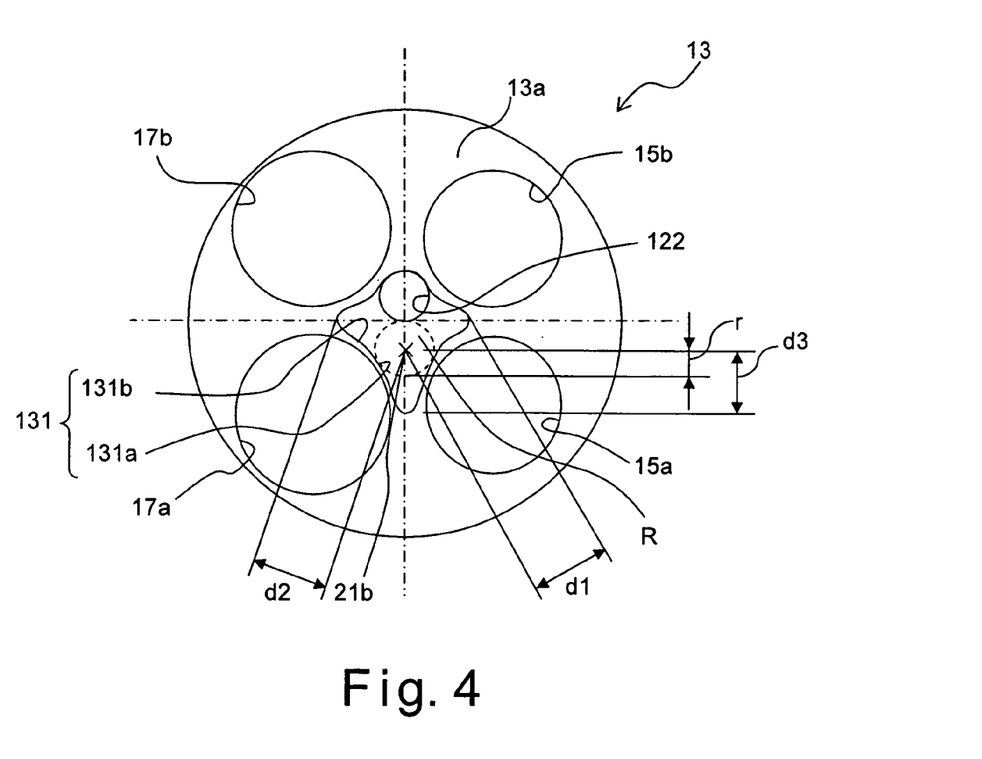
FIG. 4 is a simplified diagrammatic plan view of a combustion chamber upper surface of the cylinder head in accordance with the first embodiment of the present invention.

The cylinder head 13 preferably includes a pair of first and second exhaust ports 17*a* and 17*b* (only the first exhaust port 17*a* is shown in FIG. 1) formed in the opposite side of the cylinder head 13 from the first and second intake ports 15*a* and 15*b* relative to the cylinder center axis m. The ends of the first and second exhaust ports 17*a* and 17*b* form exhaust valve openings at the combustion chamber upper surface 13*a* that open into the combustion chamber 14 as best seen in FIG. 4. The first and second exhaust ports 17*a* and 17*b* are coupled to an exhaust manifold (not shown) to form exhaust passages. An exhaust valve 18 is provided in each of the exhaust valve openings formed on the combustion chamber upper surface 13*a* to fluidly connect and disconnect the first and second exhaust ports 17*a* and 17*b* from the combustion chamber 14 by opening and closing the first and second exhaust ports 17*a* and 17*b*. The intake valves 16 and the exhaust valves 18 are preferably driven by an intake cam 19 and an exhaust cam 20, respectively, in a conventional manner.

The engine 1 further includes a fuel injector 21 configured and arranged for supplying fuel directly into the combustion chamber 14. As seen in FIG. 1, the fuel injector 21 is preferably installed in the cylinder head 13 above a center portion of the piston 12. The engine 1 also includes a spark plug 22 that is installed closely adjacent to the fuel injector 21 for igniting the fuel from the fuel injector 21.

More specifically, the fuel injector 21 is arranged in the cylinder head 13 to be slightly tilted toward the front side of the engine 1 with respect to the cylinder center axis m. The spark plug 22 is preferably tilted toward the rear side of the engine 1 with respect to the cylinder center axis m, i.e., in the opposite direction from the fuel injector 21 is tilted, such that an acute angle is formed between the center axes of the fuel injector 21 and the spark plug 22. This acute angle is preferable 45° or less. The fuel injector 21 is preferably a multi-hole injector having a plurality of injection vents provided at a nozzle tip 21*a* of the fuel injector 21. The fuel injector 21 is configured and arranged to inject a fuel from the fuel injection vents so that an overall shape of the fuel injected from the injection vents form a generally hollow cone shape. The multi-hole injectors are conventional components that are well known in the art. Since such multi-hole injectors are well known in the art, these structures will not be discussed or illustrated in detail herein.

Moreover, the fuel injector 21 is preferably disposed in the cylinder head 13 so that a center axis of the hollow cone shape fuel stream (i.e., a fuel injection center axis n of the fuel injector 21 shown in FIG. 2) is substantially parallel to the cylinder center axis m. As used herein, "substantially parallel" is defined to include any arrangement of the cylinder center axis m and the fuel injection center axis n so long as the fuel injection center axis n is arranged with respect to the cylinder center axis m so that the fuel stream is effectively guided by a cavity 121 formed on the top surface of the piston 12 to form a swirling fuel stream directed toward the spark plug 22. The generation of swirling inside the combustion chamber 14 is discussed later in more detail. In the engine 1, the fuel injector 21 is supplied with fuel that has been pressurized to a prescribed pressure by a fuel pump (not shown).

As mentioned above, the piston 12 preferably includes the cavity 112 on the top surface thereof for guiding the fuel stream injected from the fuel injector 21 upwardly towards the tip of the spark plug. The cavity 112 preferably comprises an inner cavity 112*a* formed in a generally center portion of the top surface of the piston 12 and an outer cavity 112*b* formed around a perimeter of the inner cavity 112*a*. The inner cavity 112*a* is preferably configured and arranged to have a cross sectional shape of a circle centered on the cylinder center axis m in a plane perpendicular to the cylinder center axis m. The outer cavity 112*b* is preferably configured and arranged to have an annular shape that is substantially concentric with the inner cavity 112*a* in a cross sectional view in a plane perpendicular to the cylinder center axis m. The bottom surface of the inner cavity 112*a* is preferably configured and arranged to be substantially flat within a plane perpendicular to the cylinder center axis m. The bottom surface of the outer cavity 112*b* is preferably slanted relative to the bottom surface of the inner cavity 112*a* such that a depth of the outer cavity 112*b* increases as moving away from the, cylinder center axis m. Thus, the inner cavity 112*a* and the outer cavity 112*b* formed on the top surface of the piston 12 are configured and arranged to generate swirling of the fuel stream by guiding the fuel stream injected from the fuel injector 21 toward the spark plug 22.

FIG. 2 is a schematic partial cross sectional view of a portion of the cylinder head 13 where the fuel injector 21 and the spark plug 22 are installed. The cross sectional view shown in FIG. 2 is taken along a plane that is parallel to the direction in which the cylinder bores 11*a* are arranged (i.e., perpendicular to the view of FIG. 1).

As seen in FIG. 2, the cylinder head 13 is provided with a fuel injector receiving opening 121 formed as a through hole that passes through the cylinder head 13 in a direction from the outside to the inside of the engine 1. The fuel injector receiving opening 121 is generally centered on the fuel injection center axis n that is slightly slanted relative to the cylinder center axis m as seen in FIG. 2. Although the fuel injection center axis n of the fuel injector 21 is slightly slanted with respect to the cylinder center axis m in the first embodiment shown in FIG. 2, the degree of the slanting is set to be substantially small (preferably about 10° or less) to avoid losing the swirl forming action of the fuel stream as explained above.

The cylinder head 13 further includes a recess portion R disposed at a first end (bottom end) of the fuel injector receiving opening 121 that is closer to the combustion chamber 14. The fuel injector receiving opening 121 is communicated with the combustion chamber 14 with the recess portion R disposed therebetween. A second end (upper end) of the fuel injector receiving opening 121 opens to the outside of the engine 1. The recess portion R has a peripheral side wall surface 131 that is continuously formed between the first end of the fuel injector receiving opening 121 and the combustion chamber upper surface 13*a*.

As seen in FIG. 2, in the first embodiment of the present invention, the peripheral side wall surface 131 of the recess portion R is generally tapered such that an internal diameter of the recess portion R increases as it approaches the combustion chamber 14. Furthermore, at least one portion of the peripheral side wall surface 131 is expanded or bulged in a predetermined radial outward direction to form a negative pressure relief channel. This bulging of the peripheral side wall surface 131 results in a non-circular cross sectional shape of the peripheral side wall surface 131 in planes perpendicularly arranged relative to the fuel injection center axis n. In other words, the peripheral side wall surface 131 of the recess portion R is preferably configured and arranged to have a geometric cross sectional outline along planes perpendicularly arranged relative to the fuel injection center axis n.

More specifically, the peripheral side wall surface 131 of the recess portion R includes a first wall section 131a forming an inner space or first space disposed in a generally center section of the recess portion R. The first wall section 131a preferably has a substantially circular cross sectional shape in the planes perpendicularly arranged relative to the fuel injection center axis n as shown in FIG. 2. The peripheral side wall surface 131 of the recess portion R further includes a second wall section 131b (shown in FIG. 4) forming a second space disposed adjacent to the first space and adjoined with the first space so that the first space and the second space together form the recess portion R. The second space formed by the second wall section 131b of the peripheral side wall surface 131 preferably functions as a negative pressure relief channel that is configured and arranged to reduce negative pressure within the recess portion R as explained in more detail below.

In order to better explain the arrangement of the recess portion R, an imaginary shape of the first wall section 131a is illustrated in the schematic view shown in FIG. 4 with a dotted line. The overall structure of the recess portion R including the second wall section 131b will be described in detail later. As seen in FIG. 2, the fuel injector 21 is inserted in the fuel injector receiving opening 121 along a center axis of the fuel injector 21 (which coincides with the fuel injection center axis n) so that the nozzle tip 21a of the fuel injector 21 is disposed in the recess portion R. As explained above, the nozzle tip 21a of the fuel injector 21 is provided with the injection vents, and thus, the injection vents are disposed within the recess portion R enclosed by the peripheral side wall surface 131. Moreover, the fuel injector 21 is inserted into the fuel injector receiving opening 121 so that the nozzle tip 21a is positioned higher than the combustion chamber upper surface 13a of the cylinder head 13 with respect to a cylinder block mating surface 13b of the cylinder head 13 that mates with the cylinder block 11. In other words, when a height hc is a maximum height of the combustion chamber upper surface 13a as measured perpendicularly from the cylinder block mating surface 13b, and a height hi is a height of the nozzle tip 21a as measured perpendicularly from the cylinder block mating surface 13b, the height hc is smaller than the height hi (hc<hi).

Moreover, the spark plug 22 is preferably installed in the cylinder head 13 on the opposite side of the cylinder center axis m from the fuel injector 21 when viewed in the cross section shown in FIG. 2. The spark plug 22 is preferably configured and arranged such that a spark discharge gap of the spark plug 22 is positioned below the combustion chamber upper surface 13a and below the nozzle tip 21a of the fuel injector 21 as shown in FIG. 2.

As seen in FIGS. 1 and 2, the operation of the engine 1 is preferably controlled comprehensively by a control unit (ECU) 31. The control unit 31 is configured to receive a signal fed from an air flow meter 41 that detects an intake air quantity Qa, a signal fed from a crank sensor 42 which is used to calculate an engine rotational speed Ne, and a signal fed from a temperature sensor 43 that detects the coolant temperature Tw. The control unit 31 is configured to compute the fuel injection quantity and fuel injection timing of the fuel injector 21 and the ignition timing of the spark plug 22 based on these signals, and control the operations of the fuel injector 21 and the spark plug 22 accordingly.

Moreover, the control unit 31 is configured to switch between a diffuse (homogeneous) combustion mode and a stratified combustion mode depending on the operating state of the engine 1. For the diffuse combustion mode, the air-fuel ratio is set to a value substantially close to a stoichiometric ratio and the fuel injection timing is set to occur during the intake stroke so that the fuel-air mixture is formed with a fuel stream that is diffused (homogeneous) throughout the entire combustion chamber 14. For the stratified combustion mode, the air-fuel ratio is set to a value larger than the stoichiometric air-fuel ratio and the fuel injection timing is set to occur during the compression stroke so that a stratified fuel-air mixture is formed with a fuel stream that is concentrated in a region close to the spark plug 22.

Figure 3:
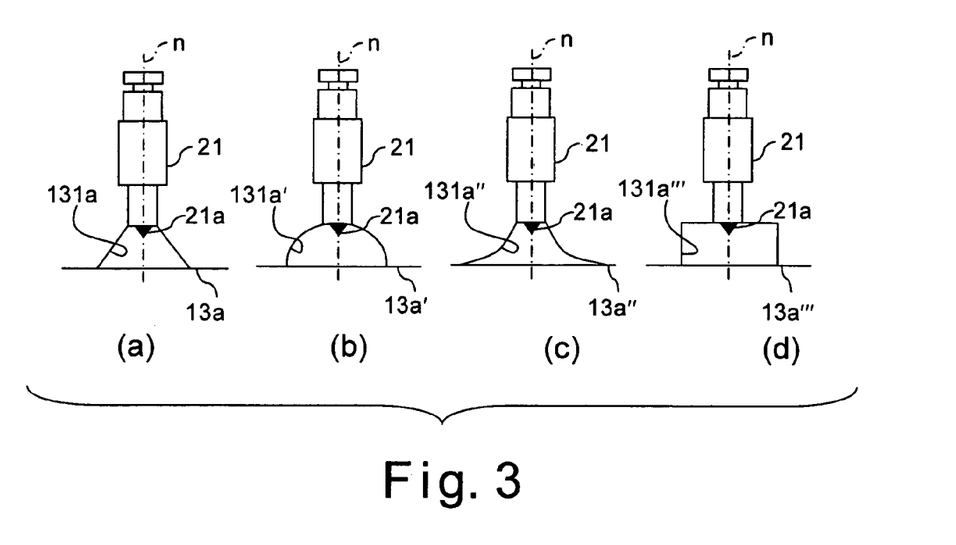
FIGS. 3(a) to (d) are simplified diagrammatic partial cross sectional views of examples of a shape of the first wall section of the recess portion formed in the cylinder head in accordance with the first embodiment of the present invention.

Although the first wall section 131a of the peripheral side wall surface 131 is shown as being tapered in a substantially straight manner in FIG. 2, the tapering of the recess portion R is not limited to the arrangement shown in FIG. 2. For example, diagrams (a) to (d) of FIG. 3 show schematic views of different examples of an imaginary shape of the first wall sections 131a, 131a', 131a" and 131a'''. Although the recessed portion R is shaped by the first wall section 131a and the second wall section 131b of the peripheral side wall surface 131 as explained above, only the shape of the first wall sections 131a, 131a', 131a" and 131a''' are shown to simplify the illustration. It will be apparent to those skilled in the art from this disclosure that a second wall section will be formed adjacent to such first wall sections 131a, 131a', 131a" and 131a''' to in order to provide the negative pressure relief channel. In all of the four examples shown in the diagrams (a) to (d) of FIG. 3, a space formed by the first wall section 131a, 131a', 131a" or 131a''' (equivalent to the "first space") is substantially circular in planes arranged perpendicular to the fuel injection center axis n.

As seen in the diagrams (a) to (d) of FIG. 3, the first wall section 131a, 131a', 131a" or 131a''' is arranged to enclose the nozzle tip 21a of the fuel injector 21. As explained above, in the first embodiment, the internal diameter of the first wall section 131a preferably expands as the first space approaches the combustion chamber 14 to form an escape for the fuel stream injected from the fuel injector 21. In other words, the first wall sections 131a, 131a', 131a" and 131a''' are formed so that the fuel stream injected from the fuel injector 21 in a generally hollow cone shape does not interfere with the first wall sections 131a, 131a', 131a" and 131a''' before the fuel stream reaches the combustion chamber 14. The example shown in the diagram (a) of FIG. 3 is basically identical to the first wall section 131a shown in FIG. 2, and configured such that the first wall surface 131a is substantially linear and slanted or tapered with respect to the fuel injection center axis n in a cross sectional view taken along a plane substantially parallel to the fuel injection center axis n. The first wall surface 131a' shown in the diagram (b) of FIG. 3 is configured such that, in the cross sectional view take along the plane substantially parallel to the fuel injection center axis n, the first wall section 131a' is curved or concave and the amount of slant of the first wall section 131a' with respect to the fuel injection center axis n decreases as the first space formed by the first wall section 131a' approaches the combustion chamber 14. The first wall section 131a" shown in the diagram (c) of FIG. 3 is configured such that, in the cross sectional view take along the plane substantially parallel to the fuel injection center axis n, the first wall surface 131a" is curved or convex and the amount of slant of the first wall section 131a" with respect to the fuel injection center axis n increases as the first space formed by the first wall section 131a" approaches the combustion chamber 14. In other words, the first wall section 131a″ curves such that that amount of slant changes in the opposite manner as in the first wall section 131a′ shown in the diagram (b) of FIG. 3. The first wall section 131a‴ shown in the diagram (d) of FIG. 3 is configured such that, in the cross sectional view take along the plane substantially parallel to the fuel injection center axis n, the first wall section 131a‴ is flexed to a substantially right angle so that the overall shape of the first space formed by the first wall section 131a‴ is that of a circular cylinder.

Referring now to FIG. 4, an overall shape of the recess portion R including the second wall section 131b will be explained. FIG. 4 is a simplified bottom plan view of the combustion chamber upper surface 13a of the cylinder head 13. For the sake of simplicity, outlines illustrating the first wall section 131a (shown with a dotted line), the spark plug opening 122, the intake and exhaust ports openings are shown in a substantially circular manner. However, it will be apparent to those skilled in the art from this disclosure that these outlines may not be precisely circular shape in a bottom plan view due to the pentroof structure of the combustion chamber 13. The second wall section 131b is integrally formed with the first wall section 131a in which the nozzle tip 21a of the fuel injector 21 is disposed. The first wall section 131a and the second wall section 131b together form a single space (the recess portion R) linking the fuel injector receiving opening 121 and the combustion chamber 14. The second wall section 131b also serves to expand the overall space of the recess portion R so that the first space formed by the first wall section 131a is expanded in predetermined radial directions with respect to the fuel injection center axis n. The parts in the entire recess portion R that are expanded by the second wall section 131b beyond the first space corresponds to the second space or the channel.

More specifically, a distance as measured from the fuel injection center axis n of the fuel injector 21 to the peripheral side wall surface 131 (hereinafter referred as "wall surface distance d") changes as one moves around the fuel injection center axis n in a circumferential direction of the peripheral side wall surface 131. In other words, the peripheral side wall surface 131 is formed such that the wall surface distance varies as the second space formed by the second wall section 131b protrudes from the first space formed by the first wall section 131a into different directions where there are less interference between the second wall section 131b and other parts in the cylinder head 13. More specifically, in the first embodiment of the present invention shown in FIG. 4, the second wall section 131b is configured and arranged to form the second space with generally lobe shapes that protrude from the first space into first, second and third directions. The first direction is defined as a direction toward an interval between the first and second intake ports 15a and 15b. The second direction is defined as a direction toward an interval between the first and second exhaust ports 17a and 17b. The third direction is defined as a direction toward an interval between the first intake port 15a and the first exhaust port 17a that are disposed in one side of the cylinder head 13 that is opposite from the side where the spark plug 22 is positioned. In other words, the second wall surface 131b is configured and arranged such that a first maximum wall surface distance d1 from a tip center part 21b of the fuel injector 21 (that coincides with the fuel injection center axis n) in the first direction, a second maximum wall surface d2 from the tip center part 21b in the second direction and a third maximum wall surface distance d3 from the tip center part 21b in the third direction are larger than an internal radius r of the first wall section 131a as shown in FIG. 4.

Alternatively, it is also acceptable for the second wall section 131b to be configured to expand beyond the first space formed by the first wall section 131a in any one or combination of the first, second and third directions described above.

Figure 5:
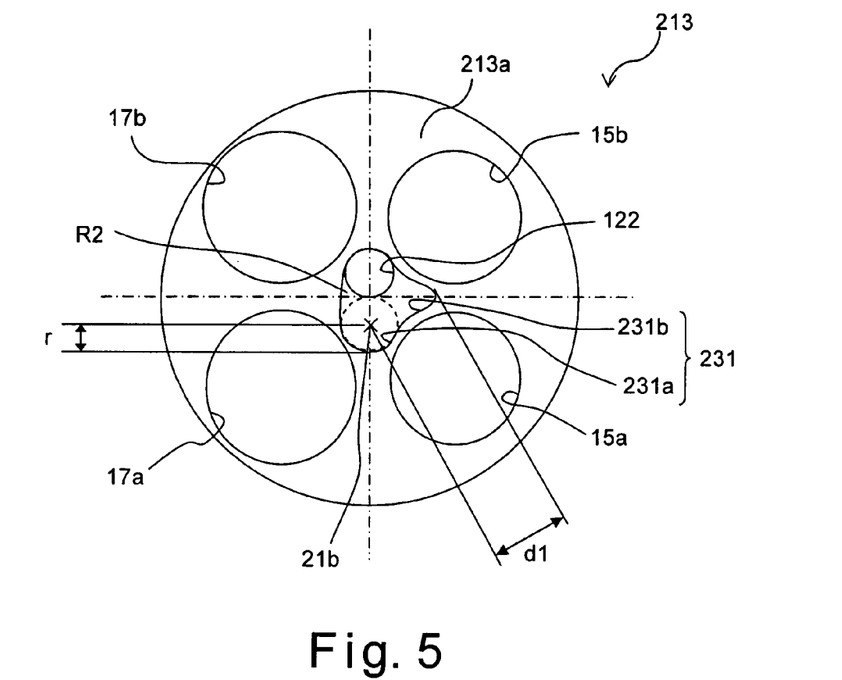
FIG. 5 is a simplified diagrammatic plan view of a combustion chamber upper surface with a first alternative structure of the recess portion in accordance with the first embodiment of the present invention.

For example, FIG. 5 is a schematic bottom plan view of a combustion chamber upper surface 213a of a cylinder head 213. In a recess portion R2 of the cylinder head 213, a second wall section 231b protrudes only in the first direction (i.e., the direction oriented toward the interval between the first and second intake ports 15a and 15b). In other words, the first maximum wall surface distance d1 of the second wall section 231b measured from the tip center part 21b (the fuel injection center axis n) of the fuel injector 21 is set to be greater than the internal radius r of a first space formed by a first wall section 231a.

Figure 6:
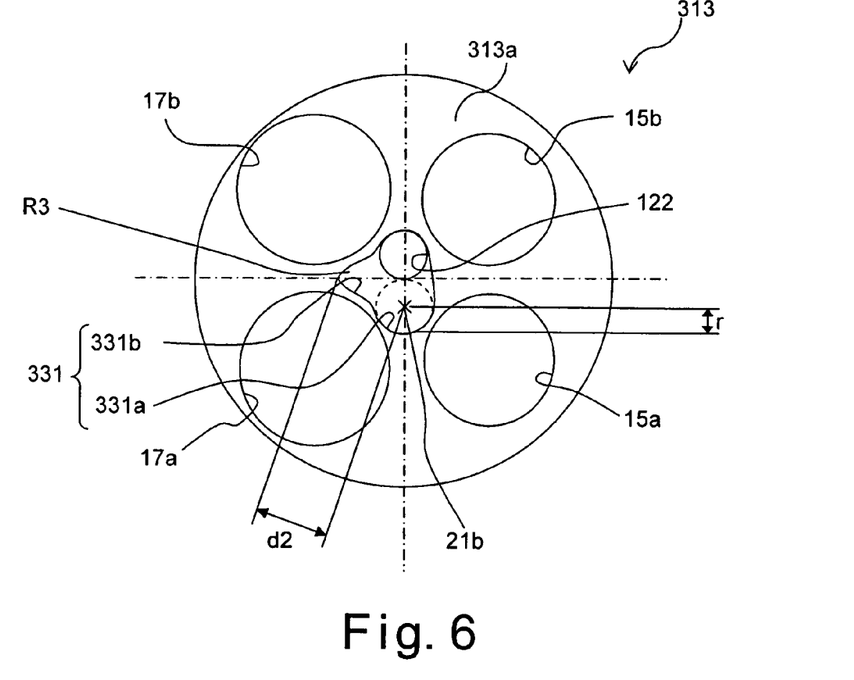
FIG. 6 is a simplified diagrammatic plan view of a combustion chamber upper surface with a second alternative structure of the recess portion in accordance with the first embodiment of the present invention.

FIG. 6 is a schematic bottom plan view of a combustion chamber upper surface 313a of a cylinder head 313. In a recess portion R3 of the cylinder head 313, a second wall section 331b protrudes only in the second direction (i.e., the direction oriented toward the interval between the first and second exhaust ports 17a and 17b). In other words, the second maximum wall surface distance d2 of the second wall section 331b measured from the tip center part 21b (the fuel injection center axis n) of the fuel injector 21 is set to be greater than the internal radius r of a first space formed by a first wall section 331a.

Figure 7:
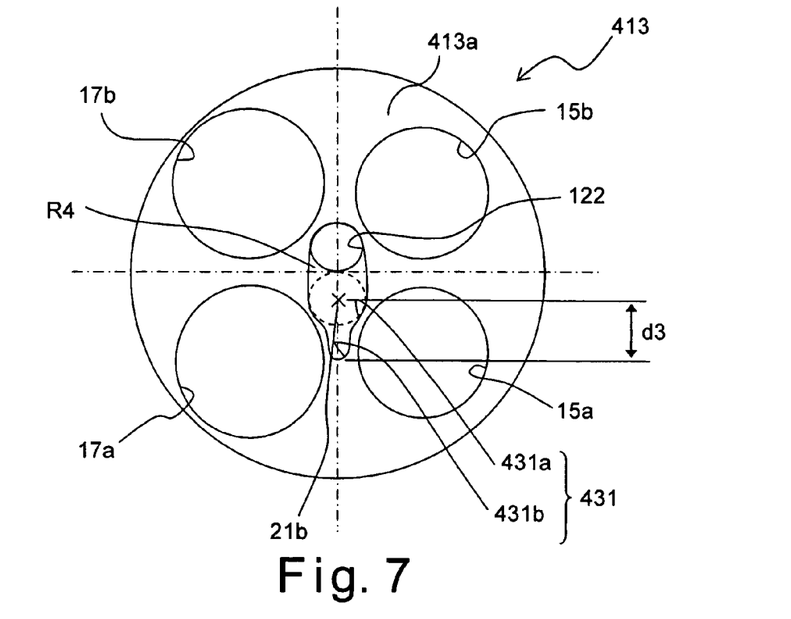
FIG. 7 is a simplified diagrammatic plan view of a combustion chamber upper surface with a third alternative structure of the recess portion in accordance with the first embodiment of the present invention.

FIG. 7 is a schematic bottom plan view of a combustion chamber upper surface 413a of a cylinder head 413. In a recess portion R4 of the cylinder head 413, a second wall section 431b protrudes only in the third direction (i.e., the direction oriented toward the interval between the first intake port 15a and the first exhaust port 17a). In other words, the third maximum wall surface distance d3 of the second wall section 431b measured from the tip center part 21b (the fuel injection center axis n) of the fuel injector 21 is set to be greater than the internal radius r of a first space formed by a first wall section 431a.

Figure 8:
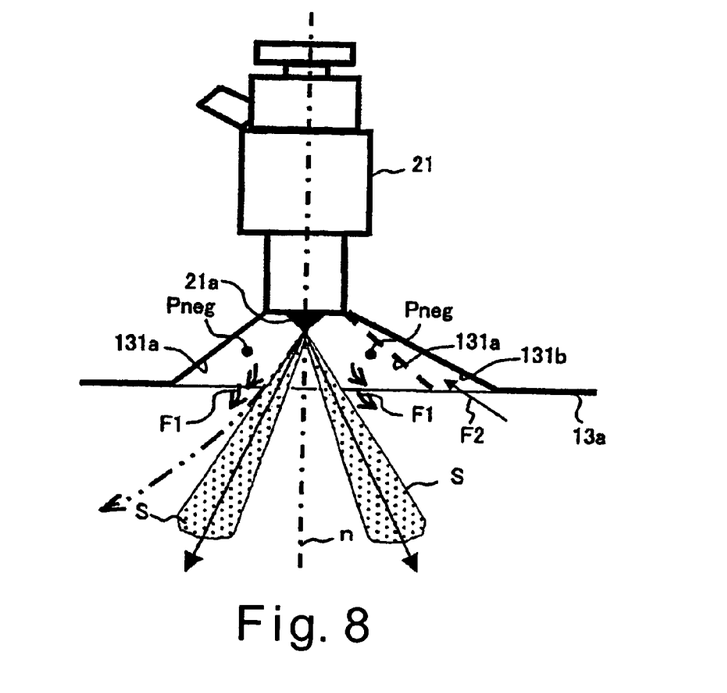
FIG. 8 is a simplified diagrammatic partial cross sectional view of the fuel injector and the recess portion of the cylinder head for illustrating a behavior of a fuel stream injected from the fuel injector in accordance with the first embodiment of the present invention.

Referring now to FIG. 8, the effects obtained by providing the second wall section 131b to the recess portion R of the cylinder head 13 in addition to the first wall section 131a will now be described. FIG. 8 is a simplified schematic partial cross sectional view of a portion of the cylinder head 13 with the first wall section 131a and the second wall section 131b illustrating the behavior of a fuel stream S immediately after injected from the fuel injector 21. As explained above, the fuel injector 21 is configured and arranged to inject the fuel stream S from the injection vents such that an overall shape of the fuel stream S is substantially hollow cone shape. If the recess portion R of cylinder head 13 was not provided with the second wall section 131b and constituted solely by the first wall section 131a, the volume of the recess portion R would be smaller, and the fuel stream S passed closely adjacent to a wall surface of the first wall section 131a before flowing into the combustion chamber 14. In such case, an air F1 inside the first wall section 131a would be pulled by the fuel stream S and drawn into the combustion chamber 14 along with the fuel stream S. Consequently, a negative pressure Pneg would develop inside the recess portion R in a space between the fuel stream S and the first wall surface 131a since it would be difficult for air to flow into the first space formed by the first wall section 131a from the combustion chamber 14. This negative pressure Pneg would act to draw the path of the fuel stream S toward the first wall section 131a and distort the shape of the fuel stream S such that the desired shape of the fuel stream S could not be achieved. As a result, during the engine 1 is operating in the stratified combustion mode in which the engine 1 is designed to produce a stratified fuel-air mixture using the cavity 121 provided on the top surface of the piston 12, it would be difficult to make the fuel stream S strike the top surface of the piston 12 in appropriate positions because the shape of the fuel stream S is distorted.

However, this distortion of the shape of the fuel stream S can be prevented by providing the second wall section 131b that is continuously formed with the first wall section 131a such that the first space formed by the first wall section 131a is partially widened as it approaches the combustion chamber 14. This second wall section 131b is configured and arranged to provide an escape channel for the fuel stream S by expanding the space formed by the entire peripheral side wall surface 131. In other words, the second wall section 131b is configured and arranged to form the negative pressure relief channel through which air F2 can flow from the combustion chamber 14 into the recessed portion R and thereby suppress the development of negative pressure Pneg in the recessed portion R. In other words, the generation of the negative pressure Png can be suppressed by the inflow of the air F2 from the combustion chamber 14 into the first space formed by the first wall section 131a via the second space (the channel) formed by the second wall section 131b.

Accordingly, with the first embodiment of the present invention, the layout interference between the fuel injector 21 and the spark plug 22 is alleviated by positioning the fuel injector 21 in the cylinder head 13 higher than the combustion chamber upper surface 13a of the cylinder head 13.

Also, in addition to the first wall section 131a within which the nozzle tip 21a of the fuel injector 21 is enclosed, the second wall section 131b is provided which expands the recess portion R by expanding the first space formed by the first wall section 131a. The second wall section 131b is configured and arranged such that the second space formed by the second wall section 131b is integrally formed with the first space formed by the first wall section 131a and the combustion chamber 14. As a result, the development of negative pressure Pneg inside the recess portion R during injection of the fuel is suppressed and the fuel stream S having the desired shape can be formed.

Moreover, the direction in which the second wall section 131b protrudes from the first space formed by the first wall section 131a is set to be oriented toward the first, second, and/or third direction (i.e., toward the interval between the first and second intake ports 15 and 15, between the first and second exhaust ports 17a and 17b and/or between the first intake port 15a and the first exhaust port 17a). Consequently, the channel for the air in the recess portion R can be maximized and the development of the negative pressure Pneg is suppressed in spite of the layout limitation to avoid the interference with other parts of the cylinder head 13.

Furthermore, additional effects are obtained in conjunction with the third effect just described. More specifically, when the expansion direction of the second wall section 131b is oriented toward the first direction (i.e., toward the interval between the first and second intake ports 15a and 15b), it is not necessary to change the shape of a coolant passage provided in the vicinity of the first and second exhaust ports 17a and 17b. On the other hand, when the expansion direction of the second wall section 131b is oriented toward the second direction (i.e., toward the interval between the first and second exhaust ports 17a and 17b), the combustion that occurs inside the recess portion R is stabilized.

Second Embodiment

Referring now to FIGS. 9 to 12, a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 9:
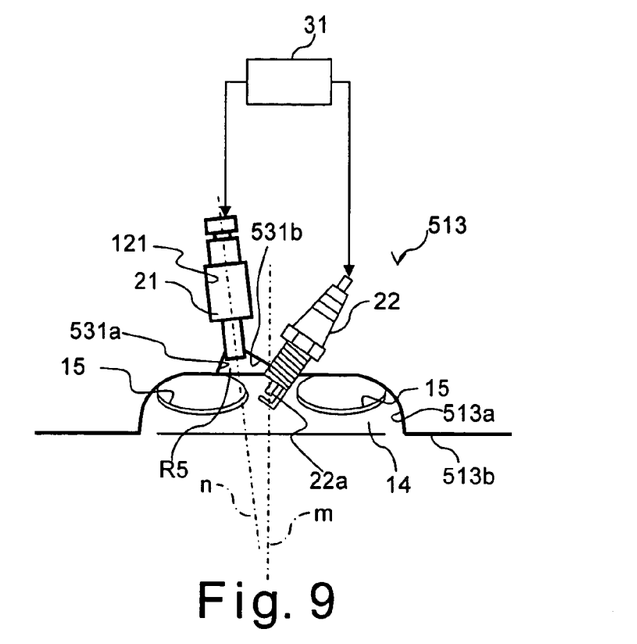
FIG. 9 is an enlarged diagrammatic partial cross sectional view illustrating a fuel injector and a spark plug disposed in a cylinder head of a direct fuel injection internal combustion engine in accordance with a second embodiment of the present invention.

The second embodiment is basically identical to the first embodiment except for an arrangement of a recess portion R5 of a cylinder head 513. FIG. 9 is a partial cross sectional view of a portion of the cylinder head 513 in accordance with the second embodiment of the present invention. The cross sectional view shown in FIG. 9 is taken along a plane that is parallel to the direction in which the cylinder bores 11 a are arranged.

As seen in FIG. 9, in the second embodiment, a second wall section 531b of a peripheral side wall surface 531 of the recess portion R5 is configured and arranged to protrude toward the spark plug opening 122 where the spark plug 22 is installed. In other words, the wall surface distance (i.e., the distance from the fuel injection center axis n of the fuel injector 21 to the wall surface of the peripheral side wall surface 531) becomes larger than the internal radius of a first space formed by a first wall section 531a as it approaches a direction oriented toward a center axis of the spark plug opening 122. Moreover, the first space formed by the first wall section 531a and the spark plug opening 122 are linked by the second space formed by the second wall section 531b as seen in FIG. 9.

Figure 10:
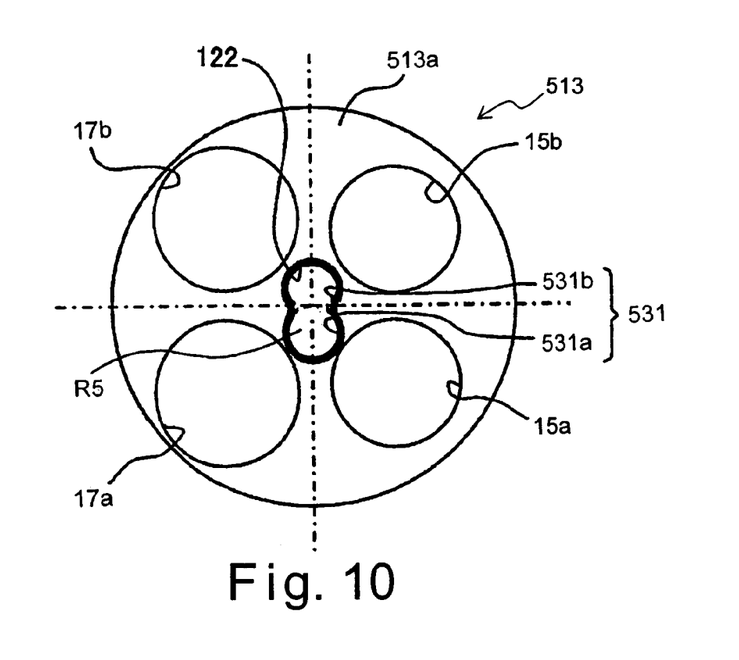
FIG. 10 is a simplified diagrammatic plan view of a combustion chamber upper surface of the cylinder head of the direct fuel injection internal combustion engine illustrated in FIG. 9 in accordance with the second embodiment of the present invention.

FIG. 10 is a simplified bottom plan view of a combustion chamber upper surface 513a of the cylinder head 513 in accordance with the second embodiment. As seen in FIG. 10, the second wall section 531b is configured and arranged such that portions of the second wall section 531b that are facing each other between the first wall section 531a and the spark plug opening 122 are curved inwardly toward each other. Thus, as seen in FIG. 10, an overall outline of the peripheral side wall surface 531 at the combustion chamber upper surface 513a forms a figure of eight.

With the second embodiment of the present invention, since the recess portion R5 of the cylinder head 513 is expanded toward the spark plug opening 122, the existence of a sharp edge can be prevented in a connecting portion between the fuel injector receiving opening 121 and the spark plug opening 122 of the cylinder head 513. As a result, localized heating of the cylinder head 513 can be alleviated. Additionally, the second embodiment is advantageous over the first embodiment in that it is easier to secure a space required for the second wall section 531b when the recess portion R5 is expanded toward the spark plug opening 122 than when the recessed portion R is expanded toward the first, second and/or third direction as in the first embodiment.

Figure 11:
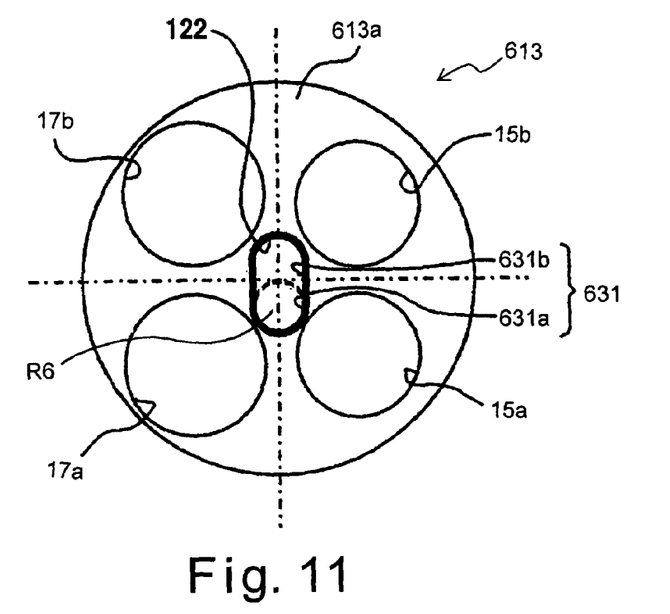
FIG. 11 is a simplified diagrammatic plan view of a combustion chamber upper surface with a first alternative structure of the recess portion in accordance with the second embodiment of the present invention.
Figure 12:
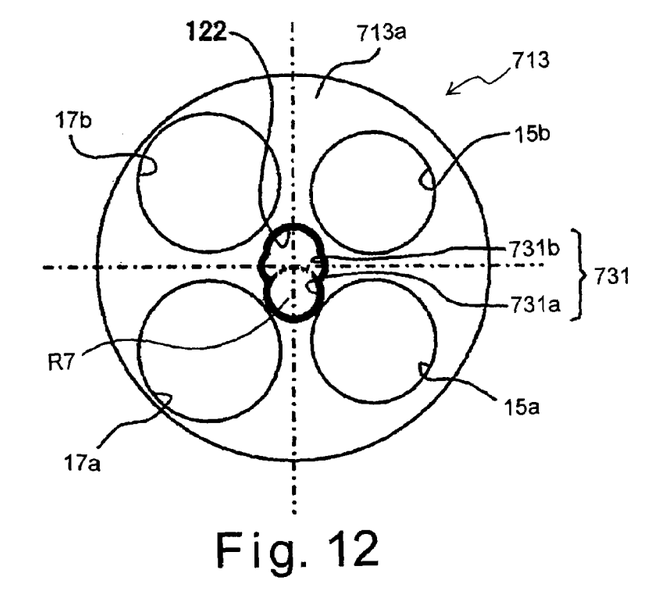
FIG. 12 is a simplified diagrammatic plan view of a combustion chamber upper surface with a second alternative structure of the recess portion in accordance with the second embodiment of the present invention.

Alternatively, the second wall section 531b can be arranged as a second wall section 631b as shown in FIG. 11, or a second wall section 731b as shown in FIG. 12, in accordance with the second embodiment.

As shown in FIG. 11, the second wall section 631 b is configured and arranged so that portions of the second wall section 631b that face each other between a first wall section 631a and the spark plug opening 122 are substantially parallel to each other. Thus, an overall outline of a peripheral side wall surface 631 at a combustion chamber upper surface 613a form a substantially oval shape. On the other hand, as shown in FIG. 12, the second wall section 731b is configured and arranged so that portions of the second wall section 731b that face each other between a first wall section 731a and the spark plug opening 122 are curved outwardly away from each other. In either the second wall section 631b or the second wall section 731b, the space (a recess portion R6 or R7) formed by the peripheral side wall surface 631 or 731 is expanded in a portion between the first wall section 631a or 731a and the spark plug opening 122. With the second wall section 631b shown in FIG. 11, the overall shape of the recess portion R6 is simplified, and thus, the die used to form the recess portion R6 can be removed more easily when the cylinder head 613 is cast molded. On the other hand, with the arrangement of the second wall section 731b shown in FIG. 12, the second wall section 731b can be formed using a simple machining method after the first wall section 731a alone has been formed by cast molding.

Although in the first and second embodiments described above, the fuel injector 21 is explained as a multi-hole type fuel injector, the present invention is not limited to such a fuel injector. For example, a fuel injector provided with a swirl tip or swirl nozzle to promote further atomization of the fuel can also be used as the fuel injector 21. In such case too, the fuel injector 21 is configured and arranged to inject a fuel stream with a generally hollow cone shape.

Third Embodiment

Referring now to FIGS. 13(a) to 13(c) and 14(a) to 14(c), a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a single prime (').

Figure 13A:
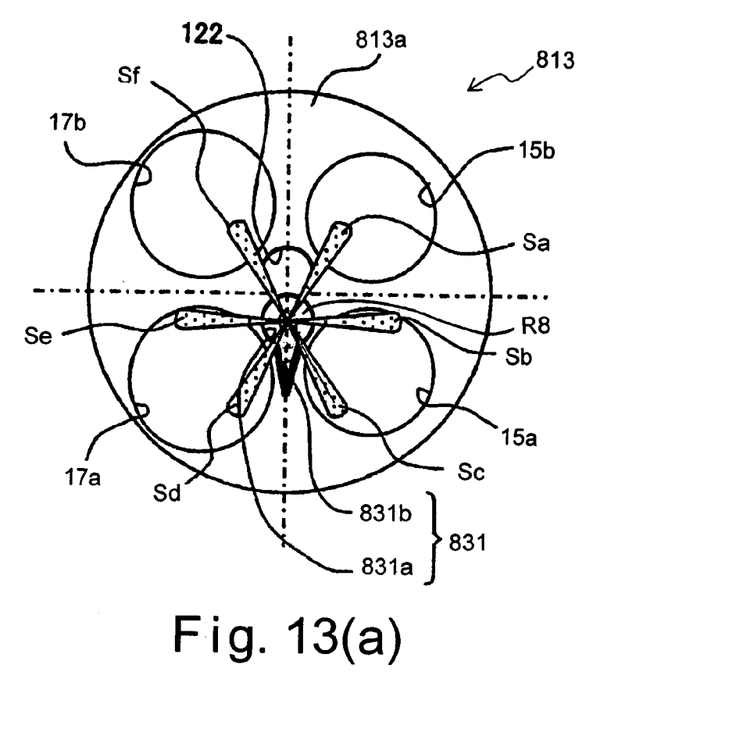
FIG. 13(a) is a simplified diagrammatic plan view of a combustion chamber upper surface of a cylinder head of a direct fuel injection internal combustion engine in accordance with a third embodiment of the present invention.
Figure 13B:
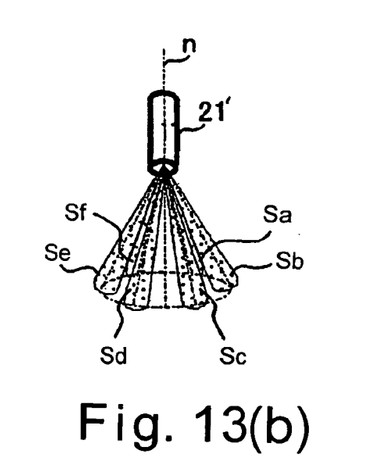
FIG. 13(b) is a diagrammatic view illustrating a fuel stream injected from a fuel injector in accordance with the third embodiment of the present invention.
Figure 13C:
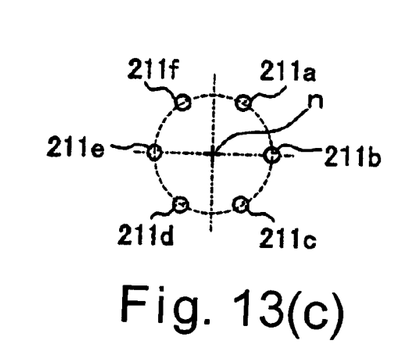
FIG. 13(c) is a schematic view of a plurality of injection vents formed on a tip portion of the fuel injector in accordance with the third embodiment of the present invention.

FIG. 13(a) is a simplified bottom plan view of a combustion chamber upper surface 813a of a cylinder head 813 in accordance with the third embodiment of the present invention. The cylinder head 813 of the third embodiment is basically identical to the cylinder head 13 of the first embodiment except for an arrangement of a recess portion R8 formed by a peripheral side wall surface 831. Moreover, in the third embodiment of the present invention, a fuel injector 21' is a multi-hole fuel injector having six injection vents 211a to 211f arranged with equal circumferential spacing about the fuel injection center axis n as shown in FIGS. 13(b) and 13(c). The fuel injector 21' is configured and arranged such that the fuel injected from the injection vents 211a to 211f form individual fuel streams Sa to Sf, respectively, and the fuel streams Sa to Sf collectively form a fuel stream having an overall shape of a generally hollow cone. A second wall section 831b of the recess portion R8 is configured and arranged such that a wall surface distance becomes larger in a direction lying between center axes of two adjacent injection vents (e.g., injection vents 211c and 211d as shown in FIG. 13(c)) than an internal radius of a first space formed by a first wall section 831a. Thus, an overall shape of the recess portion R8 of the cylinder head 813 is expanded in the direction lying between the center axes of the two adjacent injection vents. Of course, it will be apparent to those skilled in the art from this disclosure that the recess portion R8 can be expanded in a direction toward the interval of center axes of any pair of two adjacent vents in FIG. 13(c) as long as the expansion of the recess portion R does not result in the interference between the second wall surface 831b and other parts of the cylinder head 813.

Figure 14:
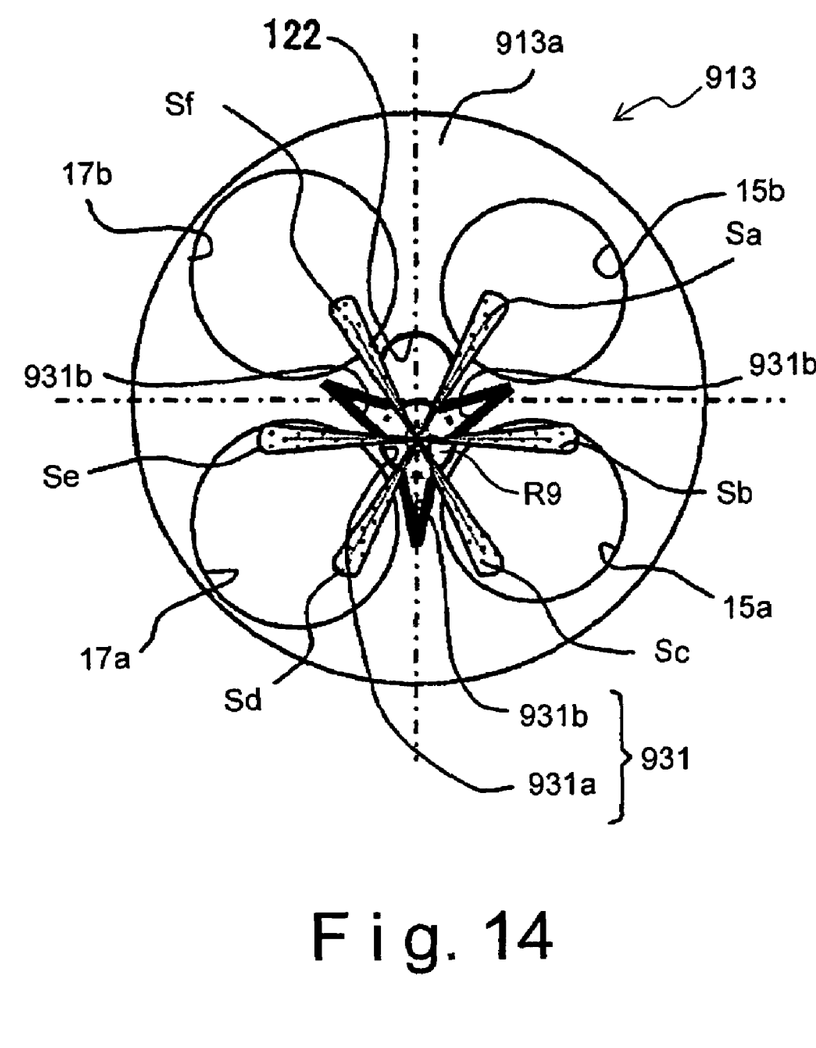
FIG. 14 is a simplified diagrammatic plan view of a combustion chamber upper surface of a cylinder head of a direct fuel injection internal combustion engine in accordance with an alternative structure of the third embodiment of the present invention illustrated in FIG. 13(a).

With the third embodiment of the present invention, since the recess portion R8 formed by the peripheral side wall surface 831 of the cylinder head 813 is expanded toward the interval between the center axes of two adjacent injection vents of the fuel injector 21', the air inside the combustion chamber 14 can be drawn into the recess portion R8 through the space between the fuel streams (between the fuel streams Sc and Sd in the example shown in FIG. 13(b)) when the fuel is injected from the fuel injector 21'. As a result, the development of a negative pressure Pneg in the recess portion R8 can be effectively prevented. Of course, this effect can be maximized by expanding the recess portion R8 in all the six locations toward the intervals between the center axes of all the respective pairs of adjacent injection vents 211a to 211f. However, by reducing the number of locations where the recess portion R8 is expanded to one half the number of injection vents (in this embodiment, three locations) and spacing the locations at equal intervals around the fuel injection center axis n of the fuel injector 21' as shown in FIG. 14, the air inside the combustion chamber 14 can be inducted into the recess portion R8 substantially uniformly. Thus, the negative pressure can be effectively prevented from affecting an overall shape of the fuel streams Sa to Sf.

In the embodiments described above, the first wall sections 131a to 831a are configured and arranged to be widen as approaching the combustion chamber 14 to form an escape channel for the fuel stream S in the wall surface of the recess portions R to R8, this feature is not indispensable for obtaining the effect of suppressing the development of negative pressure Pneg inside the recess portions R to R8. It is also possible to obtain such an effect by merely expanding the recess portions R to R8 by providing the second wall sections 131b to 831b, respectively.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-427304. The entire disclosure of Japanese Patent Application No. 2003-427304 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A direct fuel injection internal combustion engine comprising:
   an engine block having at least one cylinder bore with a piston mounted to reciprocate therein along a reciprocation axis;
   a cylinder head disposed on the engine block with a combustion chamber formed by an combustion chamber upper surface of the cylinder head, the cylinder bore and a top surface of the piston, the cylinder head including a recess portion continuously formed within the combustion chamber upper surface; and
   a fuel injector disposed in the recess portion of the cylinder head above a center portion of the piston, the fuel injector being arranged such that a tip of the fuel injector is located above the combustion chamber upper surface within the recess portion to inject fuel such that a fuel injection center axis is substantially parallel to the reciprocation axis of the piston;
   the recess portion of the cylinder head having a peripheral side wall surface with a similar geometric cross sectional outline along planes perpendicularly arranged relative to the fuel injection center axis, the geometric cross sectional outline of the peripheral side wall surface having a first wall section being spaced by a first distance from the fuel injection center axis that is shorter than a second distance between a second wall section and the fuel injection center axis as measured perpendicularly to the fuel injection center axis, the second wall section defining a channel extending longitudinally away from the tip of the fuel injector that is configured and arranged to reduce negative pressure within the recess portion otherwise resulting from fuel being injected from the fuel injector.

2. The direct fuel injection internal combustion engine as recited in claim 1, wherein
   the first wall section of the recess portion is configured and arranged to form an inner space with a substantially circular cross sectional shape along planes perpendicularly arranged relative to the fuel injection center axis, and
   the channel defined by the second wall section is adjoined with the inner space formed by the first wall section.

3. The direct fuel injection internal combustion engine as recited in claim 1, wherein
   the recess portion is configured and arranged such that an area encompassed by the geometric cross sectional outline of the peripheral wall becomes larger as it approaches closer to the combustion chamber.

4. The direct fuel injection internal combustion engine as recited in claim 1, wherein
   the cylinder head includes first and second intake ports formed in one side of the cylinder head with respect to the fuel injector, and
   the channel formed by the second wall section of the recess portion protrudes toward a portion between the first and second intake ports.

5. The direct fuel injection internal, combustion engine as recited in claim 1, wherein
   the cylinder head includes first and second exhaust ports formed in one side of the cylinder head with respect to the fuel injector, and
   the channel formed by the second wall section of the recess portion protrudes toward a portion between the first and second exhaust ports.

6. The direct fuel injection internal combustion engine as recited in claim 1, wherein
   the cylinder head includes at least one intake port formed in a first side of the cylinder head with respect to the fuel injector, and at least one exhaust port formed in a second side of the cylinder head that is opposite from the first side, and
   the channel formed by the second wall section of the recess portion protrudes toward a portion between the intake port and the exhaust port.

7. The direct fuel injection internal combustion engine as recited in claim 1, wherein
   the cylinder head includes first and second intake ports formed in a first side of the cylinder head with respect to the fuel injector, and first and second exhaust ports formed in a second side of the cylinder head that is opposite from the first side, and
   the second wall section of the recess portion includes a plurality of channels with one of the channels protruding toward a portion between the first and second intake ports, another one of the channels protruding toward a portion between the first and second exhaust ports, and another one of the channels protruding toward a portion between the first intake port and the first exhaust port.

8. The direct fuel injection internal combustion engine as recited in claim 1, wherein
   the channel formed by the second wall section of the recess portion protrudes in a direction toward a spark plug opening formed in the cylinder head above an upper portion of the piston.

9. The direct fuel injection internal combustion engine as recited in claim 8, wherein
   the channel formed by the second wall section adjoins the spark plug opening with an inner space formed by the first wall section such that a single opening outline is formed on the combustion chamber upper surface of the cylinder head within which the tip of fuel injector and a tip of a spark plug disposed in the spark plug opening are encompassed when viewed in a direction parallel to the reciprocation axis of the piston.

10. The direct fuel injection internal combustion engine as recited in claim 9, wherein
    the second wall section and the spark plug opening are arranged such that the opening outline includes a pair of generally straight portions that are substantially parallel to each other between the inner space and the spark plug opening.

11. The direct fuel injection internal combustion engine as recited in claim 9, wherein
    the second wall section and the spark plug opening are arranged such that the opening outline includes a pair of concaved portions that face each other so that the channel formed by the second wall section expands outwardly between the inner space and the spark plug opening.

12. The direct fuel injection internal combustion engine as recited in claim 1, wherein
    the fuel injector includes a swirl nozzle to promote atomization of the fuel.

13. The direct fuel injection internal combustion engine as recited in claim 1, wherein
    the fuel injector includes a plurality of injection vents disposed on the tip of the fuel injector and arranged circumferentially around the fuel injection center axis of the fuel injector.

14. The direct fuel injection internal combustion engine as recited in claim 13, wherein the channel formed by the second wall section of the recess portion protrudes radially with respect to the fuel injection center axis along a center line between two adjacent injection vents of the fuel injector.

15. The direct fuel injection internal combustion engine as recited in claim 13, wherein the second wall section of the recess portion includes an additional channel such that the channels protrude radially with respect to the fuel injection center axis, with one of the channels protruding along a center line between first and second injection vents that are adjacent to each other and one of the channels protruding a center line between third and fourth injection vents that are adjacent to each other.

16. A direct fuel injection internal combustion engine comprising:

combustion chamber forming means for forming a combustion chamber;

fuel injection means for directly injecting a fuel into the combustion chamber;

recess means for providing a space between a tip portion of the fuel injection means and the combustion chamber such that the tip portion of the fuel injection means is positioned higher than an upper surface of the combustion chamber; and negative pressure relief means for providing a channel that is configured and arranged to reduce negative pressure within the recess means otherwise resulting from fuel being injected from the fuel injection means.

* * * * *